Figure 1:
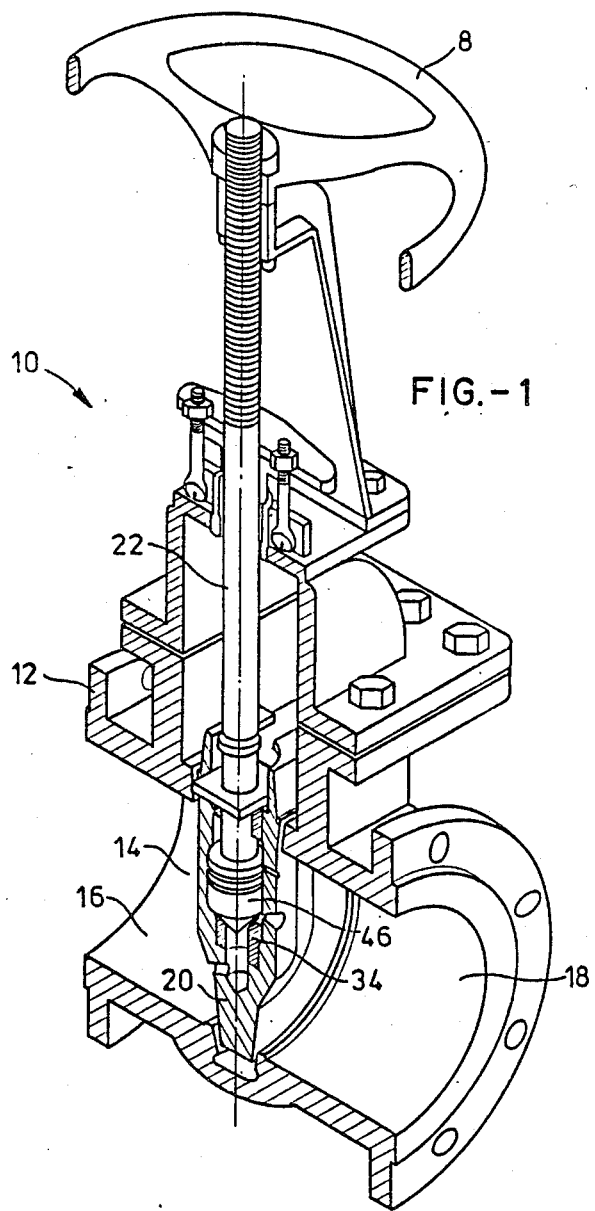

United States Patent [19]
Gyongyossy

[11] Patent Number: 4,678,008
[45] Date of Patent: Jul. 7, 1987

[54] WEDGE TYPE GATE VALVES

[76] Inventor: Leslie L. Gyongyossy, 245 N. Point St., Apt. 306, San Francisco,, Calif. 94133

[21] Appl. No.: 904,365

[22] Filed: Sep. 8, 1986

[51] Int. Cl.⁴ ............................................... F16K 3/12
[52] U.S. Cl. ............................................... 137/630.12
[58] Field of Search ............ 137/599.2, 630.15, 630.12

[56] References Cited
U.S. PATENT DOCUMENTS
745,774 12/1903 Brady ............................. 137/630.12
1,932,471 10/1933 McKellar ....................... 137/630.12

Primary Examiner—Robert G. Nilson
Attorney, Agent, or Firm—Fetherstonhaugh & Co.

[57] ABSTRACT

In a gate valve which has a pressure equalizing valve located in a chamber formed in its valve member, there is provided a vent passage opening from an expansion compartment which is located above the pressure equalizing valve, through the downstream side of the valve member such that any pressure buildup in the expansion compartment resulting from the opening of the pressure equalizing valve may be vented to the downstream side of the valve member and will not cause the pressure equalizing valve to move to its closed position.

4 Claims, 4 Drawing Figures

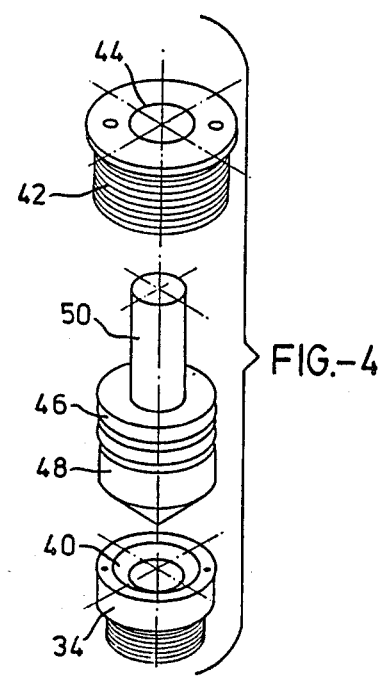

WEDGE TYPE GATE VALVES

This invention relates to gate valves. In particular, this invention relates to gate valves which have a wedge-shaped valve member and which include an internal pressure equalizing valve for use in reducing the pressure differential between the upstream and downstream sides of the wedge-shaped valve member prior to opening of the gate valve.

PRIOR ART

A wedge-shaped gate valve which incorporates a pressure equalizing valve is disclosed in French Patent No. 368,879, Oct. 22, 1906 issued to M. Perrin. In this structure, the pressure equalizing valve is in the form of a ball. When the valve stem is cracked open, the ball will be raised from the valve seat to permit fluid to flow from the upstream side to the downstream side of the valve. The chamber in which the ball is housed will become flooded with the fluid passing through the pressure equalizing passage and this pressure buildup will tend to move the ball towards the closed position closing off the through passage. This pressure buildup within the chamber above the ball valve will cause the ball valve to "chatter" even when the gate valve is moved to its opened position.

German Patent No. 52747, Carl Giebeler, dated Oct. 5, 1887 is directed to a gate valve in which the pressure valve is threadedly mounted on the main valve stem. The pressure equalizing valve cannot be moved relative to the valve stem without rotating the valve stem.

The present invention provides a wedge type gate valve in which the pressure equalizing valve is located in a chamber in the valve member which is vented to the downstream side of the gate to prevent a buildup of pressure which would cause the pressure equalizing valve to move to a closed position.

The vent passage which opens from the pressure equalizing valve chamber to the downstream side of the gate also permits a buildup of pressure in the pressure equalizing valve chamber which will prevent opening of the pressure equalizing valve when the pressure on the downstream side of the valve exceeds the pressure on the upstream side of the valve.

It is an object of the present invention to provide a simple and efficient pressure equalizing valve in a wedge-shaped valve member of a gate valve which will open freely when the pressure on the upstream side exceeds the pressure on the downstream side and the valve stem is cracked open.

It is a further object of the present invention to form the discharge of the pressure equalizing passage which opens towards the downstream side so as to generate sonic velocity in the discharging stream of gates at the normal working pressures.

According to one aspect of the present invention, there is provided in a gate valve having a valve stem mounted in a wedge-shaped valve member for limited relative movement between an extended position and a contracted position, said wedge-shaped valve member having a pressure equalizing passage opening there through which communicates between the upstream and downstream sides thereof, a pressure equalizing valve located in a chamber formed in said valve member which is arranged to communicate with said through passage, said pressure equalizing valve being movable toward and away from a valve seat located in said pressure equalizing passage to close and open the pressure equalizing passage, said chamber being proportioned to provide an expansion compartment on the side of the pressure equalizing valve remote from the valve seat to accommodate movement of the pressure equalizing valve from the closed position to the opened position, said pressure equalizing valve being freely movable within said chamber when said valve stem is in said extended position relative to said valve member, the improvement of a vent passage opening from said expansion compartment to said chamber through the downstream side of the valve member such that any pressure buildup in the expansion compartment resulting from the opening of the pressure equalizing valve may be vented to the downstream side of the valve member and will not cause the pressure equalizing valve to move to its closed position.

Figure 2:
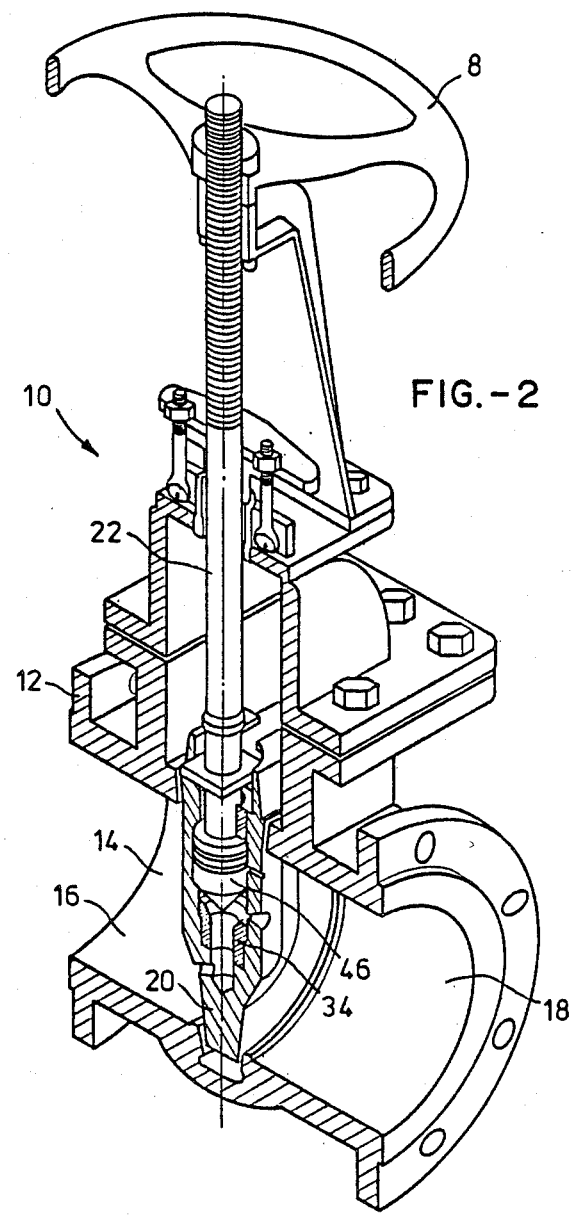
Figure 3:
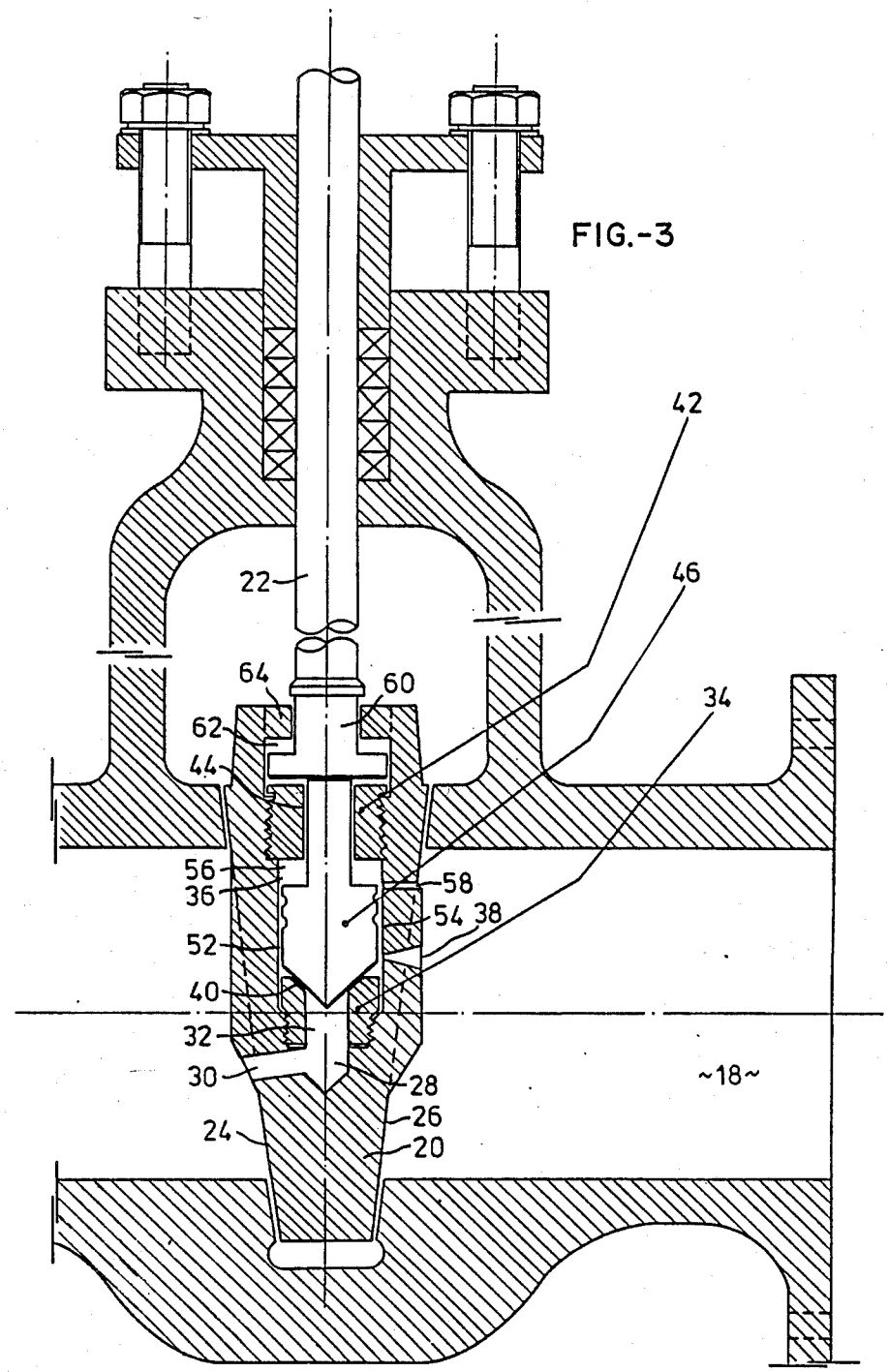

The invention will be more clearly understood after reference to the following detailed specification read in conjunction with the drawings wherein;

FIG. 1 is a sectioned pictorial side view of a gate valve constructed in accordance with an embodiment of the present invention showing the pressure equalizing valve in the closed position, FIG. 2 is a view similar to FIG. 1 showing the pressure equalizing valve in the open position, FIG. 3 is a cross-sectional side view showing the pressure equalizing valve in a partially opened position, and FIG. 4 is an exploded view of the components of the pressure equalizing valve.

With reference to FIG. 1 of the drawings, the reference numeral 10 refers generally to a gate valve constructed in accordance with an embodiment of the present invention. The valve 10 consists of a body 12 which has a through passage 14 which includes an upstream section 16 and a downstream section 18, a wedge-shaped gate valve member 20 is slidably mounted in the housing 12 and a valve stem 22 is provided for raising and lowering the gate valve.

Gate valves of this general type are well known and consequently, the structural features of the valve will not be described in detail.

The wedge-shaped gate valve member 20 has an upstream face 24 and a downstream face 26 directed toward the upstream section 16 and downstream section 18 of the through passage 14 respectively. The gate valve member 20 is formed with a pressure equalizing passage generally identified by the reference numeral 28 which extends from the upstream face 24 to the downstream face 26. The pressure equalizing passage 28 includes an input passage 30 which extends inwardly from the upstream face 24 to axial section 32. The axial section 32 opens through a replaceable valve seat insert 34 into a chamber 36. The pressure equalizing passage 28 is completed by an outlet 38 which opens into the downstream section 18. A cone-shaped valve seat 40 is formed in the insert 34. A collar 42 is threadedly mounted in the upper end of the chamber 36 and has a slipway passage 44 which opens axially therethrough. A pressure equalizing valve 46 is mounted in the chamber 36 in a free-fitting sliding relationship. The pressure equalizing valve 46 has a head portion 48 and a stem portion 50. The head portion 48 has a cone-shaped end 52 which will fit in a fluid-tight face-to-face relationship with the cone-shaped valve seat 40 in use. The head portion 48 is proportioned so as to fit in a free-fitting sliding relationship in the chamber 36 and as a result, a narrow annular gap 52 is provided between the head portion 48 and the side wall 54 of the chamber 36. This gap is sufficiently large to permit the fluid passing through the pressure equalizing passage 28 to fill the chamber 36 above the head portion 48. The stem portion 50 of the pressure equalizing valve is proportioned to fit in a free-fitting sliding relationship within the slipway passage 44. The head portion 48 is proportioned so that an expansion compartment 56 will be formed in the chamber 36 above the head portion when the head portion is seated on the valve seat. The expansion compartment 56 is proportioned to permit the movement of the head portion 52 away from the valve seat to a sufficient extent to permit full flow of fluids through the pressure equalizing passage 28. A vent passage 58 opens from the expansion compartment 56 through the downstream side of the valve member such that any pressure buildup in the expansion chamber resulting from the opening of the pressure equalizing valve may be vented to the downstream side 18.

The valve stem 22 has a T-shaped head portion 60 mounted in a complimentary notch 62 formed in the upper end of the valve member 20. The head 60 is smaller than the notch 62 so that it can be axially moved relative to the gate valve member 20 without causing movement of the gate valve member 20. This permits movement of the head portion 60 between a position in which it will bare against the stem portion 50 of the pressure equalizing valve 46 to seat the pressure equalizing valve in a position closing the through passage. In addition, the stem can be "cracked open" to provide a gap between the head 60 and the stem portion 50 of the pressure equalizing valve to permit opening of the pressure equalizing valve before the valve stem 22 engages the gate valve member 20.

It will be noted that the outlet 38 of the pressure equalizing passage 28 is longitudinally spaced with respect to the vent passage 58 in the direction of movement of the pressure equalizing valve 46. When the pressure equalizing valve 48 is seated in a position closing the through passage, the cone-shaped end of the pressure equalizing valve will be located on the side of the outlet 38 remote from the vent passage 58. As a result, any pressure which builds up in the downstream portion 18 can only be applied to the compartment 56 through the vent passage 58 and will therefore be effective in preventing opening of the pressure equalizing valve 46.

When the fluid which is to be controlled by the gate valve is a gas, the outlet 38 of the pressure equalizing passage is preferably formed as a nozzle so as to generate a discharging stream of gas at a sonic velocity into the downstream section 18 resulting from the normal pressure differential between the upstream side 16 and the downstream side 18 in the environment in which the valve is to be used. By generating a discharging stream at sonic velocity, the reaction forces will be applied in a series of shock waves to the wedge-shaped gate valve member and these shock waves will facilitate the opening of the wedge-shaped gate valve member when the handle 8 is rotated to open the gate valve member in use.

In use, when the valve member is positioned in the closed position illustrated in FIGS. 2 and 3 of the drawings, the gate valve member 20 closes the through passage 14 and the vent passage 58 communicates with the compartment 56. When the valve is to be opened, the handle 8 is rotated to raise the T-shaped head portion 60 of the stem away from the stem portion 50 of the pressure relieve valve until it comes in contact with the shoulders 64 of the notch 62. If the fluid pressure in the upstream section 16 is greater than the fluid pressure in the downstream section 18, the pressure applied by the fluid on the upstream side to the underside of the pressure equalizing valve 46 will cause the pressure equalizing valve 46 to move within the chamber 36 from the closed position to the opened position, thus opening the pressure equalizing passage 28. If the pressure differential between the upstream section 16 and downstream section 18 is sufficient, the velocity of the stream of gaseous fluid which is discharged through the outlet 38 will be sonic velocity and this will serve to generate shock waves which will be applied to the downstream face 26 of the gate valve member which will serve to facilitate the subsequent movement of the gate valve toward the open position in response to further rotation of the handle 8. When the pressure equalizing valve 46 moves to an open position, the fluid passing through the pressure equalizing passage 28 will flood the chamber 36. The fluid pressure in the chamber 36 will not, however, exceed the fluid pressure in the pressure equalizing passage 28 because the vent passage 58 will permit venting of the chamber 36 to the downstream section 18. Consequently, the pressure in the compartment 56 will always be less than the opening pressure applied to the pressure equalizing valve 46 by the fluid in the pressure equalizing passage 28 when the pressure in the upstream 16 is greater than the pressure in the downstream 18. If, however, the pressure in the downstream section should increase to the point where it is greater than the pressure in the upstream section, the pressure equalizing valve 46 be caused to act as a check valve and will close the through passage 38. This results from the fact that the pressure in the downstream section 18 can be transmitted to the fluid in the compartment 56 through the vent passage 58 and when the pressure in the compartment 56 exceeds the pressure in the pressure equalizing passage 36, the pressure equalizing valve 46 will move to a closed position bearing against the valve seat 40. This movement of the pressure equalizing valve will be independent of the movement of the valve stem 22. Thus it will be seen that the pressure equalizing valve not only serves to reduce the pressure differential between the upstream and downstream sides of the valve when the upstream is the high pressure side, but also serves to prevent fluid flow through the pressure equalizing valve in circumstances where the pressure on the upstream section 16 is greater than the pressure in the downstream section 18. The fact that the pressure equalizing valve 46 will not open in circumstances where the pressure in the downstream section is greater than the pressure in the upstream section can be helpful in many practical situations because it will make the opening of the valve much more difficult in these circumstances and this can provide a warning to the operator that the pressure conditions in the system in which the valve is installed are not the normal operating conditions.

Various modifications of the present invention will be apparent to those skilled in the art without departing from the scope of the invention.

In one such modification, a plurality of outlets 38 are formed in the downstream wall of the gate valve, each opening from the chamber 36.

I claim:

1. In a gate valve having a valve stem mounted in a wedge-shaped valve member for limited relative movement between an extended position and a contracted position, said wedge-shaped valve member having a pressure equalizing passage opening therethrough which communicates between the upstream and downstream sides thereof, a pressure equalizing valve located in a chamber formed in said valve member which is arranged to communicate with said through passage, said pressure equalizing valve being movable toward and away from a valve seat located in said pressure equalizing passage to close and open the pressure equalizing passage, said chamber being proportioned to provide an expansion compartment on the side of the pressure equalizing valve remote from the valve seat to accommodate movement of the pressure equalizing valve from the closed position to the opened position, said pressure equalizing valve being freely movable within said chamber when said valve stem is in said extended position relative to said valve member, the improvement of;

a vent passage opening from said expansion compartment of said chamber through the downstream side of the valve member such that any pressure buildup in the expansion compartment resulting from the opening of the pressure equalizing valve may be vented to the downstream side of the valve member and will not cause the pressure equalizing valve to move to its closed position.

2. A gate valve as claimed in claim 1, wherein the outlet of the pressure equalizing passage is longitudinally spaced with respect to the vent passage in the direction of movement of the pressure equalizing valve and the pressure equalizing valve is adapted to substantially close said outlet when the pressure equalizing valve is seated in said valve seat such that if the pressure on the downstream side of the main valve member is greater than that on its upstream side, the fluid pressure on the downstream side of the valve will be transmitted to said compartment and will apply a closing load to the pressure equalizing valve to prevent it from opening.

3. A gate valve as claimed in claim 1, wherein said chamber is a longitudinally elongated chamber having a collar located therein which divides it into a proximal end portion and a distal end portion, said collar having a passage opening therethrough which extends between the proximal and distal end portions of said chamber, said valve stem having a head portion mounted in said proximal end portion of said chamber which is proportioned to be movable in said proximal end portion to permit a limited relative movement between said stem and said valve member, and relative movement between the stem and the pressure equalizing valve, said pressure equalizing valve having a stem portion slidably mounted in said passage of said collar, said stem of said pressure equalizing valve being disposed opposite said head of said valve stem and arranged to bear against said head of said valve stem when the valve stem is in its contracted position and the pressure equalizing valve is seated.

4. A valve member as claimed in claim 3, wherein said pressure equalizing valve has a cone-shaped valve closure face and said valve seat is cone-shaped, the valve seat, closure valve and the through passage of the collar being axially aligned with one another to ensure proper seating of the pressure equalizing valve when closed.

* * * * *